March 16, 1971  E. J. SPRONG  3,570,140
TEACHING AID

Filed July 2, 1969  4 Sheets-Sheet 1

INVENTOR.
EDMUND J. SPRONG
BY
William L. Henry

March 16, 1971 E. J. SPRONG 3,570,140
TEACHING AID
Filed July 2, 1969 4 Sheets-Sheet 2
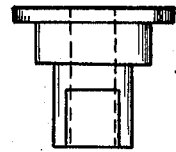
Fig. 6
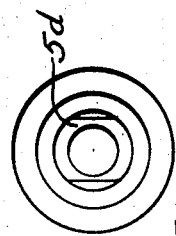
Fig. 7
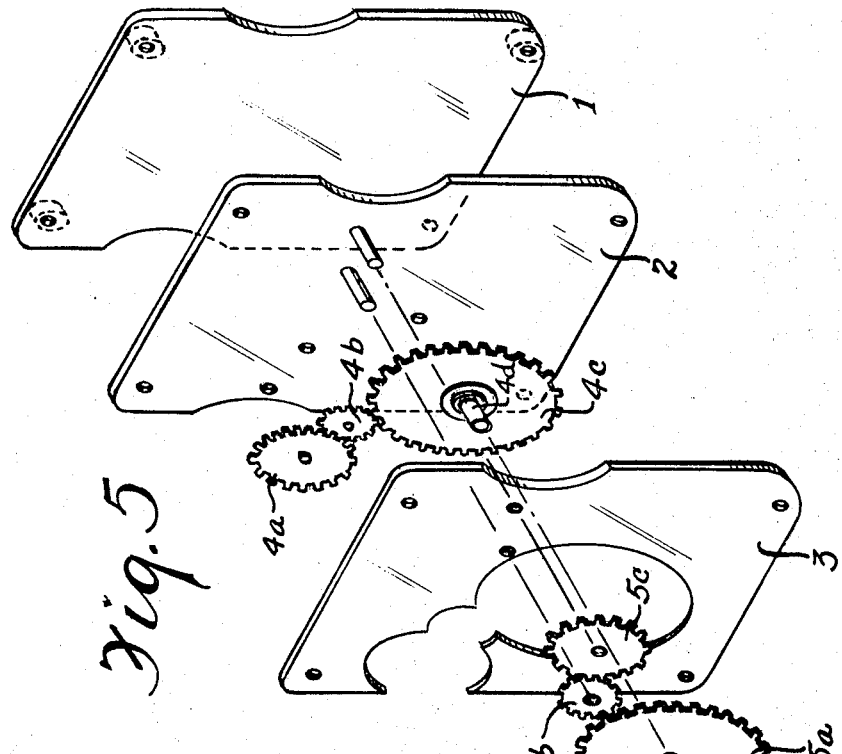
Fig. 5
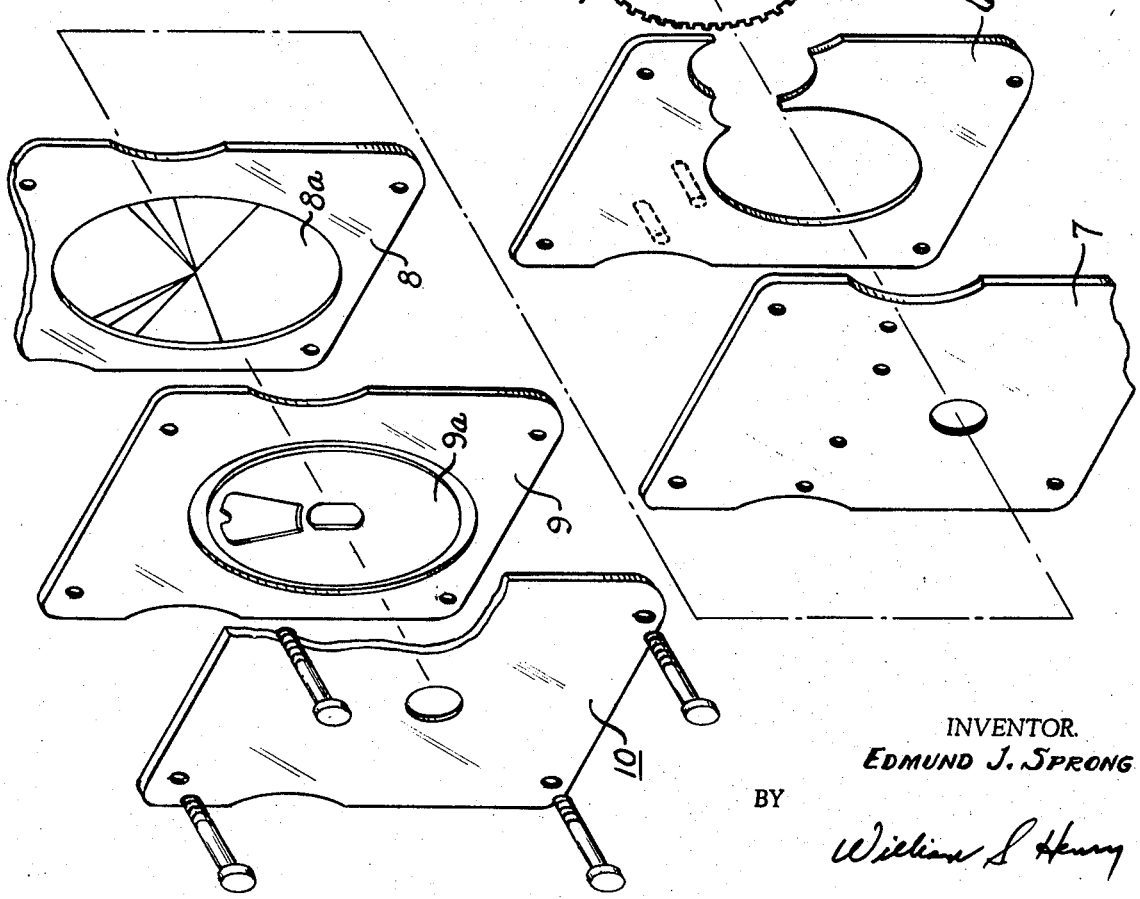
INVENTOR.
EDMUND J. SPRONG
BY
William S Henry March 16, 1971 E. J. SPRONG 3,570,140
TEACHING AID
Filed July 2, 1969 4 Sheets-Sheet 3

INVENTOR.
EDMUND J. SPRONG
BY
William S. Henry

March 16, 1971  E. J. SPRONG  3,570,140
TEACHING AID
Filed July 2, 1969  4 Sheets-Sheet 4
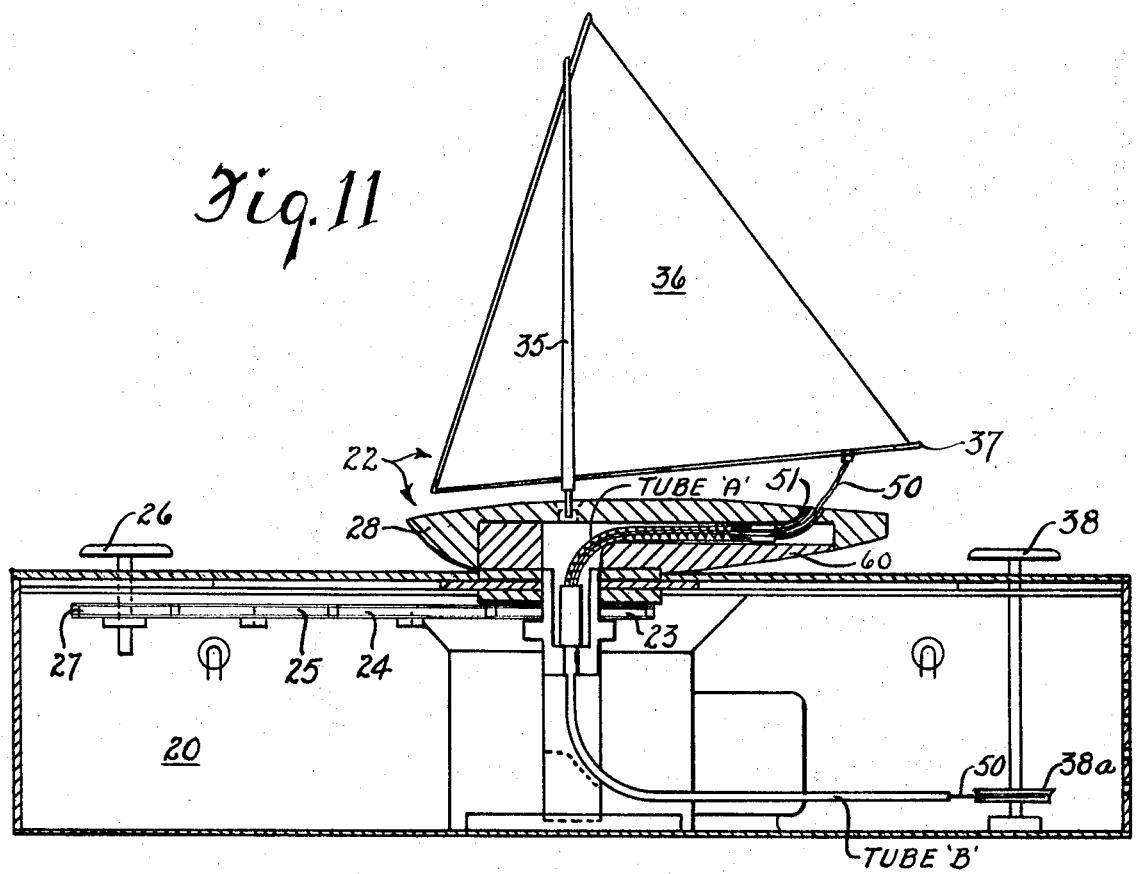
INVENTOR.
EDMUND J. SPRONG
BY
William S. Henry

United States Patent Office 3,570,140
Patented Mar. 16, 1971

3,570,140
TEACHING AID
Edmund J. Sprong, Fairfield, Conn.
(38 Lockwood Lane, Riverside, Conn. 06878)
Filed July 2, 1969, Ser. No. 838,388
Int. Cl. G09b 9/06
U.S. Cl. 35—11                                3 Claims

ABSTRACT OF THE DISCLOSURE

An aid for learning the skill of handling a sailboat in which a sailboat simulator is mounted on a base member for movement relative thereto. The surface of the base member adjacent to the simulator is provided with a window through which an instruction chart is visible. The chart is subdivided into quadrants containing sailing terminology, so that manual movement of the simulator uncovers quadrants of the chart, thereby instructing the student as to the terminology for describing the condition of the simulator and, by color coding the quadrants, the student is advised of the consequences of the condition of the simulator.

BACKGROUND OF THE INVENTION

Heretofore, in classroom teaching of the art of handling a sailboat, the instructor relied on a chalk board and his skill as a draftsman to illustrate his instructions. After the instructions were given, the student had to rely on his memory and notes for review. When the time came for actually handling a sailboat, it was apparent that little was accomplished by the classroom instruction.

SUMMARY OF THE INVENTION

In accordance with the subject invention, the art of sailing can be taught in a classroom by an instructor manipulating a simulator while presenting his lecture; and each student can also be provided with an identical simulator, which he can easily carry from the classroom for reviewing the instructions by himself—manipulating the simulator and having the lecture repeated in abbreviated form. In addition to being a teaching aid for the instructor, the device functions as a toy, thereby capturing the interest of youthful students.

One object of the invention is to provide a teaching aid for the instructor and a learning aid for the student.

Another object is to provide a device for simulating the operation of a sailboard; i.e., movement of the tiller and the sail of the simulator and having the device advise the student of terminology describing the condition of the simulator.

A third object of the invention is to provide a simulator which can be manufactured economically.

Additional objects and advantages of this invention will become apparent from the following description of the appended drawing, illustrating two presently preferred embodiments of the invention.

BRIEF DESCRIPTION OF THE DRAWING

FIG. 5 is an exploded view of the learning aid shown in FIG. 1, with the simulated boat not being shown.

FIG. 6 is a detailed side elevation of the drawing spindle for the boat as shown in the cross section, FIG. 4.

FIG. 7 is a plan view of the spindle shown in FIG. 6.

FIG. 11 is a cross sectional elevation taken generally along lines 11—11 of FIG. 9.

FIG. 12 is an exploded view partly in section of a portion of the apparatus shown in FIG. 11.

FIG. 13 is a cross section view of the carrier shown in FIG. 11.

Referring to FIGS. 1 through 8, illustrating a first embodiment of a learning aid according to the invention, in which reference numerals 1, 2, 3, 6, 7, 8 and 9 indicate a series of laminates forming a base, generally designated 10. A boat simulating model, generally designated 11, includes a hull 12, a mast 13 and a sail 14. The mast 13 and sail 14 are connected as a unit in any suitable manner and are rotated independently of the hull via a gear train, generally designated 4, including wheel 4a, idler 4b and driver 4c. The driver 4c consists of a gear having an axial spindle 4d in which a configured recess is formed to receive the similarly configured associated end portion of the mast 13 as seen in FIG. 4. That is, the end of the mast is square and the recess receiving the mast is also square and suitably dimensioned. The spindle 4d may be press-fitted into the associated gear or formed integral therewith. When the wheel 4a is moved clockwise or counter-clockwise, the mast 13 and sail 14 are similarly rotated at any desired ratio, for example, one and one-quarter turn of wheel 4a causes one turn of mast or vice versa. A second gear train, generally designated 5, consists of a wheel 5a, an idler 5b, and a gear spindle 5c. The spindle 5c has a central bore adapted to loosely receive the spindle 4d, and the face end of the spindle 5c is provided with a pair of opposed plane surfaces 5d. The boat simulator is provided with a pair of projections 12a which engage the plane or flat surfaces 5d of the spindle 5c. Therefore, when the wheel 5a is rotated clockwise or counterclockwise, the boat simulator 12 is likewise rotated by meshed gears 5a, 5b and 5c. The gear train, generally designated 5, also turns the disk 9a, which is mounted for rotation in the laminate 9. The disk 9a provides a window 9b through which the sailing guide 8a is visible. The indicia of the sailing guide is worked on the upper surface of laminate 8. Thus, the window 9b of the disk 9 and the hull of the simulator are fixed in relation to one another and are moved as a unit in response to movement imparted to the gear train 5. As seen in FIG. 4, the disk 9 has an aperture which is configured to receive the spindle 5c. This aperture is configured to have a pair of plane surfaces abutting the plane surfaces 5d of the spindle 5c in the same manner that the pair of lugs 12a of the hull 12 engage the spindle 5c.

Figure 1:
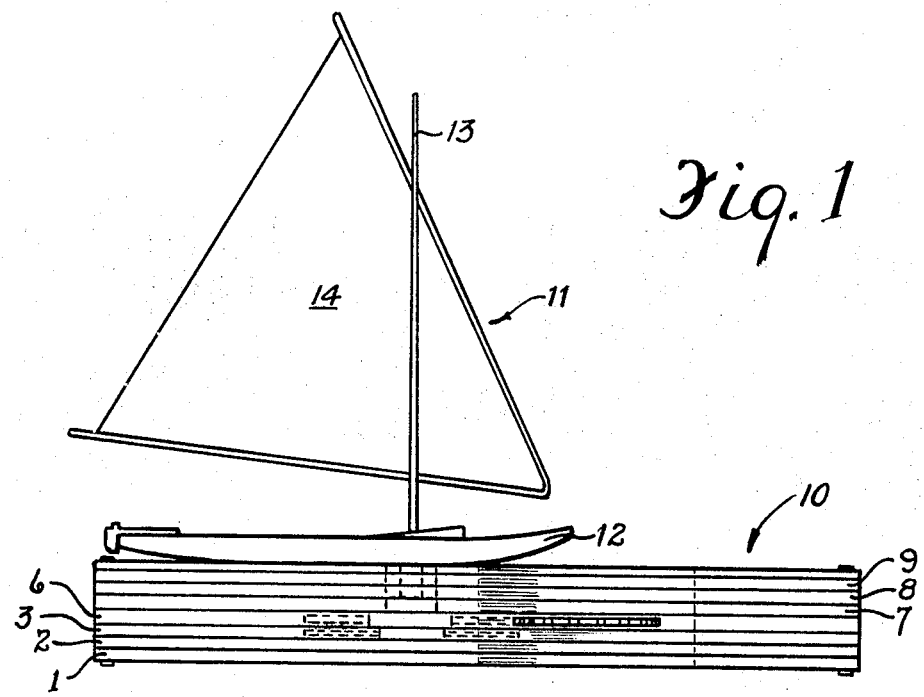
FIG. 1 is a side elevation of a first embodiment of a learning aid.
Figure 4:
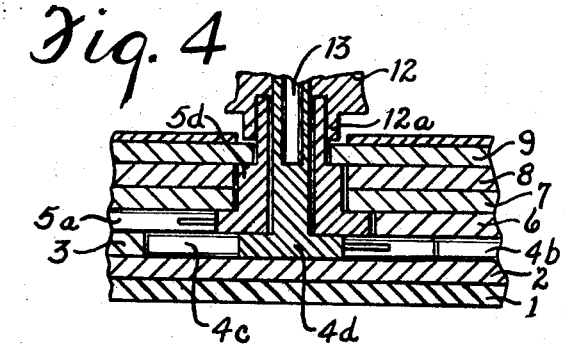
FIG. 4 is a partial cross section taken generally on line 4—4 of FIG. 2.
Figure 2:
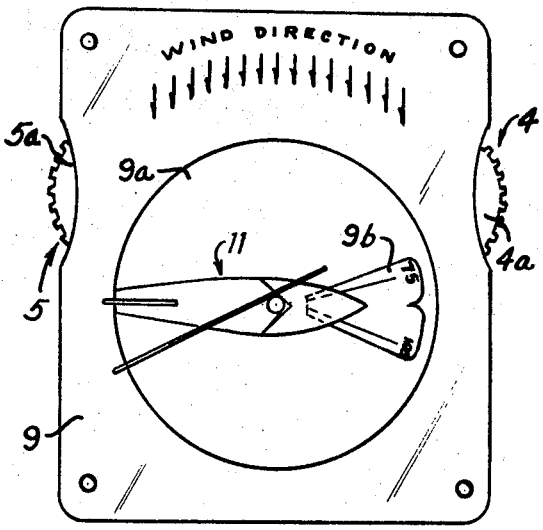
FIG. 2 is a plan view, on a smaller scale, of the teaching aid shown in FIG. 1.
Figure 3:
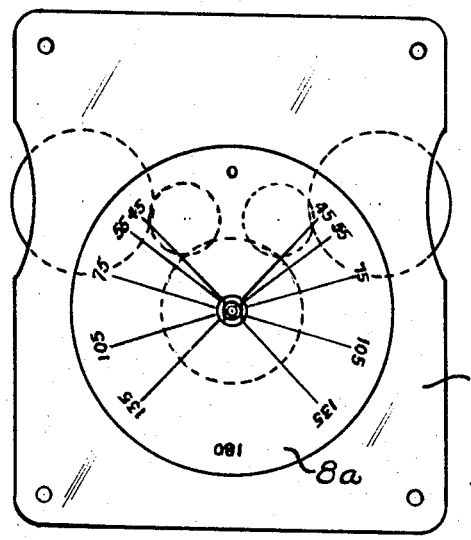
FIG. 3 is a plan view, similar to FIG. 2, in which one of the laminated sheets has been removed to illustrate the indicia on a laminate containing the sailing indicator.
Figure 8:
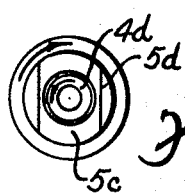
FIG. 8 is a detailed view in plan of the concentric spindles for driving the boat and the mast of the boat.

In operation, when the hull of the simulator is positioned relative to the "wind direction" printed on the upper laminate, as shown in FIG. 2, the window 9b in the disk 9a, which moves as a unit with the hull 12, uncovers an area of the sailing guide 8, giving instructions to the user as to the position which the sail 14 should take, relative to the hull. The various areas of the sailing indicator 8a can be color coded and quadrants (not shown), which are positioned on the laminate 9 relative to the sail, can also be color coded to indicate the correct position of the sail. The color coding of the sailing indicator and the color coded sail quadrants will be more fully disclosed in connection with the second embodiment of the invention as shown in FIGS. 9, 10, 11.

Figure 9:
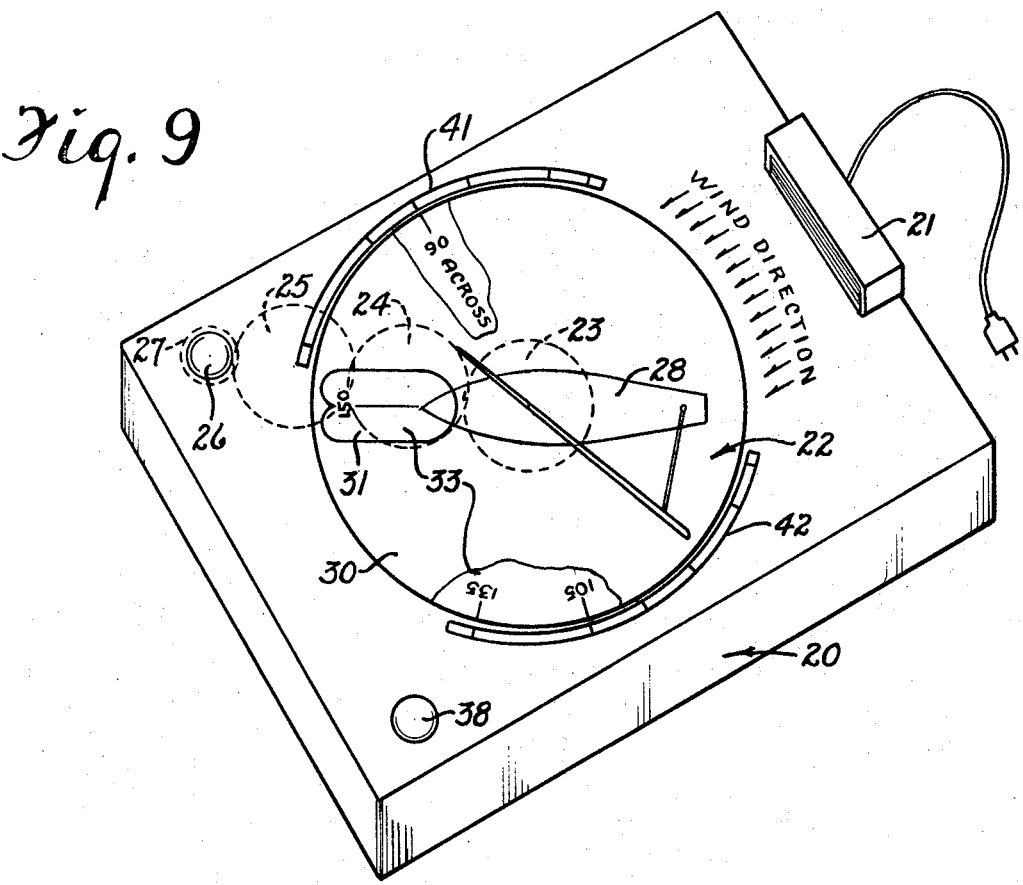
FIG. 9 is a perspective view of a second embodiment of the invention.
Figure 10:
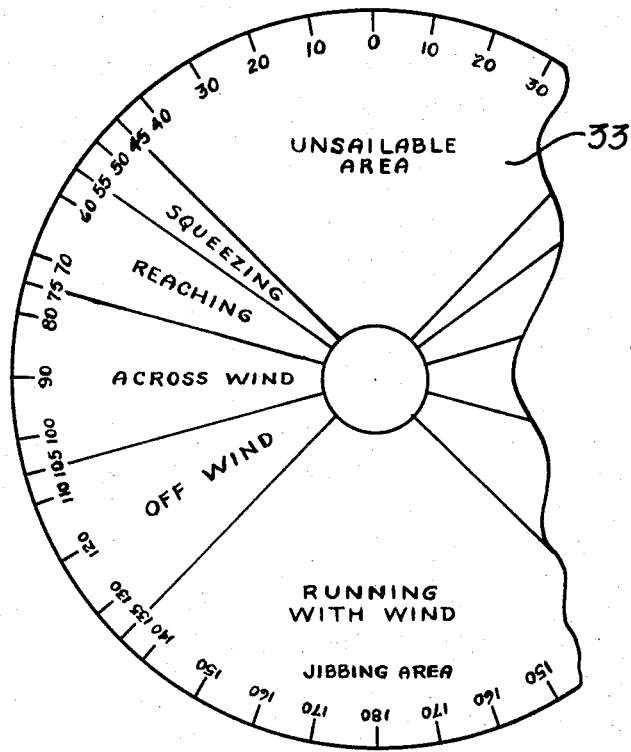
FIG. 10 is a partial plan view of a sailing indicator.

As seen in FIG. 9, the learning aid, according to the second embodiment, consists of a hollow housing member 20 having a motor-fan unit therein (not shown), which creates a wind source emanating from an outlet 21. The motor-fan unit is of a conventional design and is not shown for this reason. As previously described, the boat simulator, generally designated 22, is mounted on a carrier 60 (FIG. 13) incorporating a gear 23 which is rotatably mounted in any suitable way on the housing member 20. The gear 23 is meshed with idler gears 24 and 25 which are driven by a knob 26 having a gear 27 as best seen in FIG. 11. When the knob 26 is rotated clockwise or counterclockwise, the hull 28 of the simulator is rotated clockwise or counterclockwise respectively. As described in the first embodiment, a disk 30 having a window 31 moves with the hull 28 in order to uncover the sailing guide 33 detailed in FIG. 10. In this embodiment the mast 35 is fixed on the hull 28. However, the sail 36 and boom 37 are controlled by the knob 38 as best seen in FIG. 11 and hereinafter described. The position of the sail 36 or boom 37 is coordinated with the position of the hull 28 by color coding the sailing guide 33 as shown in FIG. 10. That is, the squeezing, reaching cross wind, off wind and running-with-wind segments of the sailing guide are each distinctively colored. The same colors are applied to the sail quadrants 41 and 42. Thus, the colors that appear in the window 31 as the hull 28 is rotated will tell the user in what position the sail 36 should be placed and this is accomplished by rotating knob 38, which either allows the sail to be moved by the wind or pulls the sail against the wind emanating from the outlet 21.

Movement of the said 36 by rotation of knob 38 will be described in connection with FIGS. 11, 12 and 13 wherein 50 designates the main sheet which is tied at one end to the boom 37, the other end of the main sheet is connected to the spool 38a on the shaft of knob 38. The main sheet 50 passes through a bend end tube 51 and a slide 52. The slide 52 is provided with a shoulder which bears against a coil spring 53 at one end of the spring. The other end of the spring bears against an internal shoulder 54 in tube A. As a result, when the main sheet is taken up on the spool 38a by rotation of the knob 38 a knot in the main sheet located as shown in FIG. 12, bears against the slide 52 thereby forcing the slide to compress the spring 53. When the knob is rotated to pay out the main sheet 50 the spring 53 provides the force necessary to overcome friction between the sheet 50 and the guide tube B and allow the main sheet 50 to become slack so that the sail 36 can move freely. As seen in FIG. 13 the tube A is fixed in a carrier 60 so that the tube A rotates with the boat whereas tube B is fixed in the housing 20.

I claim:
1. A learning aid comprising a housing member, a boat simulator rotatably mounted on said housing member, first means for rotating said simulator, a sailing indicator fixed in said housing member, a window means in said housing member exposing a segment of said indicator and positioned relative to said simulator and rotatable with said simulator by said first means, said boat simulator having a mast and sail, and a second means for rotating said sail relative to said simulator.

2. A learning aid according to claim 1 wherein said housing member comprises a plurality of laminates, one of said laminates having configured apertures therein, said first means for rotating said simulator comprising a gear train confined within said apertures of said one laminate, one gear in said gear train being connected with said boat simulator; a second laminate having configured apertures therein, said second means for rotating said sail relative to said simulator comprising a second gear train confined within the apertures of said second laminate; one of said gears of said second gear train being connected with said mast; first and second control gear wheels extending laterally beyond said laminates and connected with each said gear train for moving said simulator and mast; a third laminate having a rotatable disk therein, said window means being provided in said disk and said disc being connected with said mast.

3. A learning aid according to claim 1 wherein said housing member comprises a hollow box, a disc rotatably mounted within one panel of said box, said window means comprising an opening in said disc, means for connecting said simulator on said disc, said window exposing a section of said sailing indicator.

References Cited
UNITED STATES PATENTS 2,470,143    5/1949    Christie    35—12
3,305,943    2/1967    Hansen    35—11

WILLIAM H. GRIEB, Primary Examiner